US010131380B1

(12) United States Patent
Simmons

(10) Patent No.: US 10,131,380 B1
(45) Date of Patent: Nov. 20, 2018

(54) VERTICALLY ARTICULATING VEHICLE

(71) Applicant: Jack Simmons, Richlands, VA (US)

(72) Inventor: Jack Simmons, Richlands, VA (US)

( * ) Notice: Subject to any disclaimer, the term of this patent is extended or adjusted under 35 U.S.C. 154(b) by 0 days.

(21) Appl. No.: 14/800,508

(22) Filed: Jul. 15, 2015

Related U.S. Application Data

(60) Provisional application No. 62/024,953, filed on Jul. 15, 2014.

(51) Int. Cl.
*B62D 12/00* (2006.01)
*B62D 53/02* (2006.01)

(52) U.S. Cl.
CPC ............ *B62D 12/00* (2013.01); *B62D 53/021* (2013.01); *B62D 53/023* (2013.01)

(58) Field of Classification Search
CPC ..... B62D 12/00; B62D 53/021; B62D 53/023
See application file for complete search history.

(56) References Cited

U.S. PATENT DOCUMENTS

| 4,444,409 | A | * | 4/1984 | Garrison | B62D 53/021 |
| | | | | | 180/235 |
| 4,471,850 | A | * | 9/1984 | Rotz | B62D 53/02 |
| | | | | | 180/420 |
| 4,809,805 | A | * | 3/1989 | Short | B62D 53/021 |
| | | | | | 180/418 |
| 4,890,684 | A | * | 1/1990 | Simmons | B62D 53/021 |
| | | | | | 180/419 |
| 5,137,107 | A | | 8/1992 | Uttenthaler | |
| 5,174,597 | A | | 12/1992 | Uttenthaler | |
| 5,632,350 | A | * | 5/1997 | Gauvin | B60D 1/00 |
| | | | | | 180/14.4 |
| 5,873,431 | A | | 3/1999 | Butler et al. | |
| 6,062,801 | A | | 5/2000 | Cooper | |
| 6,361,269 | B1 | | 3/2002 | Cooper | |
| 6,604,351 | B2 | * | 8/2003 | Dillon | A01D 41/02 |
| | | | | | 180/418 |
| 6,827,164 | B2 | | 12/2004 | Palumbo et al. | |
| 7,743,869 | B2 | | 6/2010 | Flournoy, Jr. et al. | |
| 8,727,059 | B2 | * | 5/2014 | Anliker | B62D 12/00 |
| | | | | | 180/234 |
| 9,150,062 | B2 | * | 10/2015 | Hao | B60D 5/00 |
| 9,193,385 | B2 | * | 11/2015 | Svardby | B62D 12/00 |
| 2005/0039973 | A1 | * | 2/2005 | Clark | B62D 53/021 |
| | | | | | 180/418 |
| 2015/0232139 | A1 | * | 8/2015 | Petersen | B62D 53/021 |
| | | | | | 280/400 |

* cited by examiner

*Primary Examiner* — Joseph M Rocca
*Assistant Examiner* — Marlon A Arce
(74) *Attorney, Agent, or Firm* — Johnston Holroyd; Mary-Jacq Holroyd

(57) ABSTRACT

An articulated vehicle including two wheeled sections hinged together in the middle of the vehicle by a universal movement joint enabling relative pivoting about three axes extending at right angles to each other through the center of the vehicle. A hydraulically operated strut and a hydraulically operated cylinder/jack extend between the two vehicle sections. The strut is universally pivoted at its ends to the two vehicle sections to control the relative pivoting of the two vehicle sections while, the cylinder is trunnion mounted to one end and bolted to the other to permit vertical articulation of the vehicle.

20 Claims, 6 Drawing Sheets

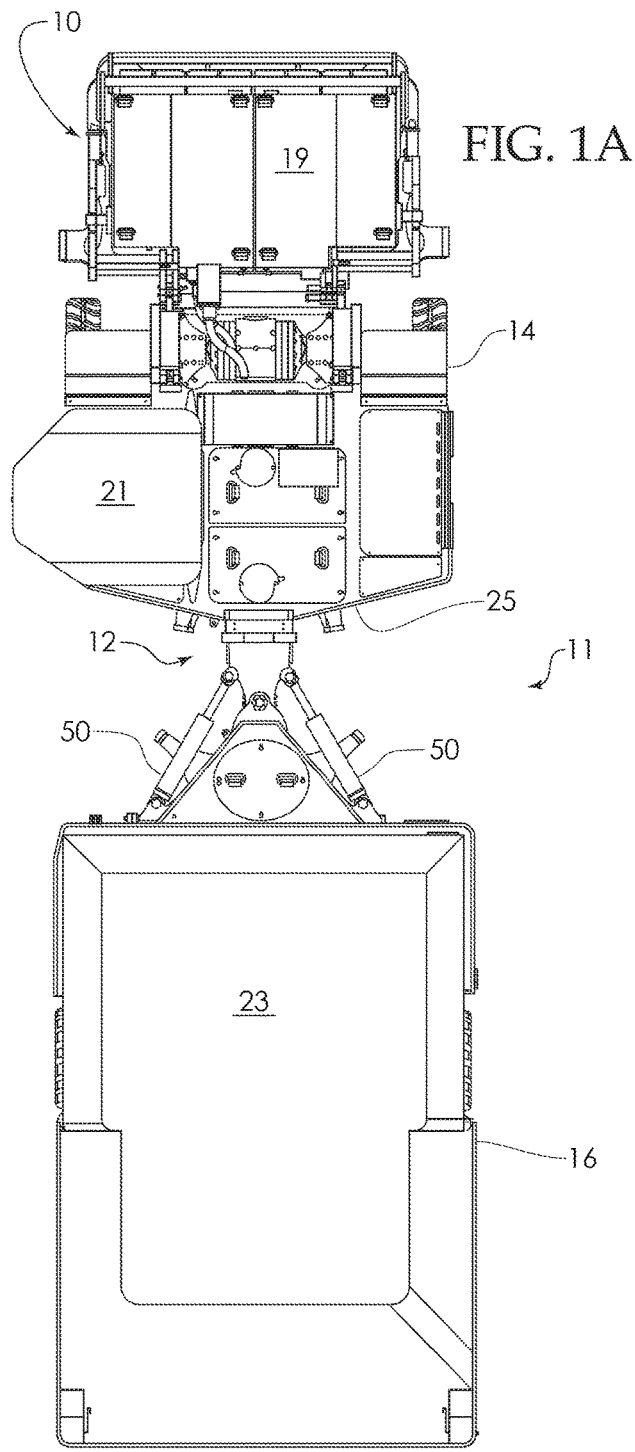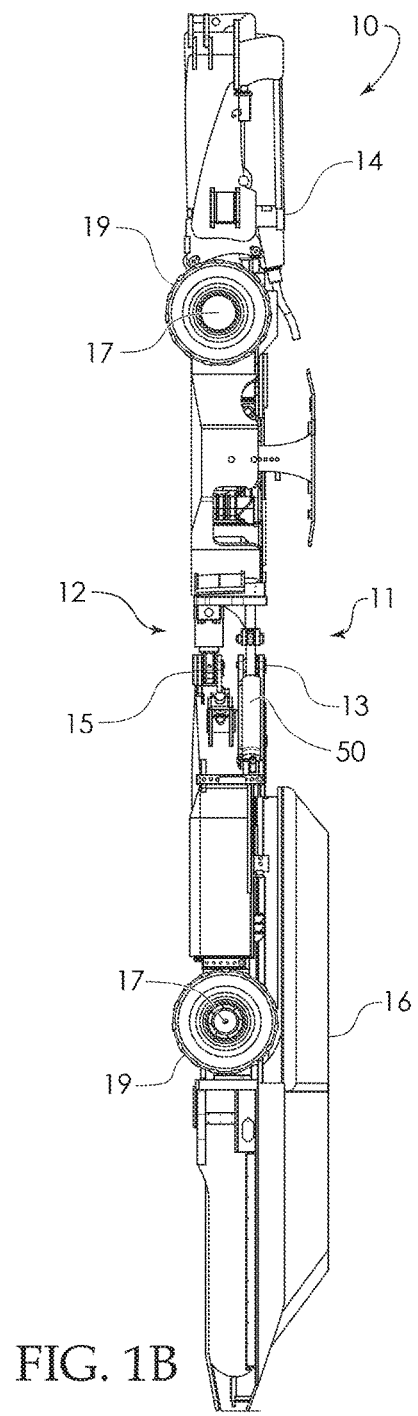
FIG. 1A
FIG. 1B

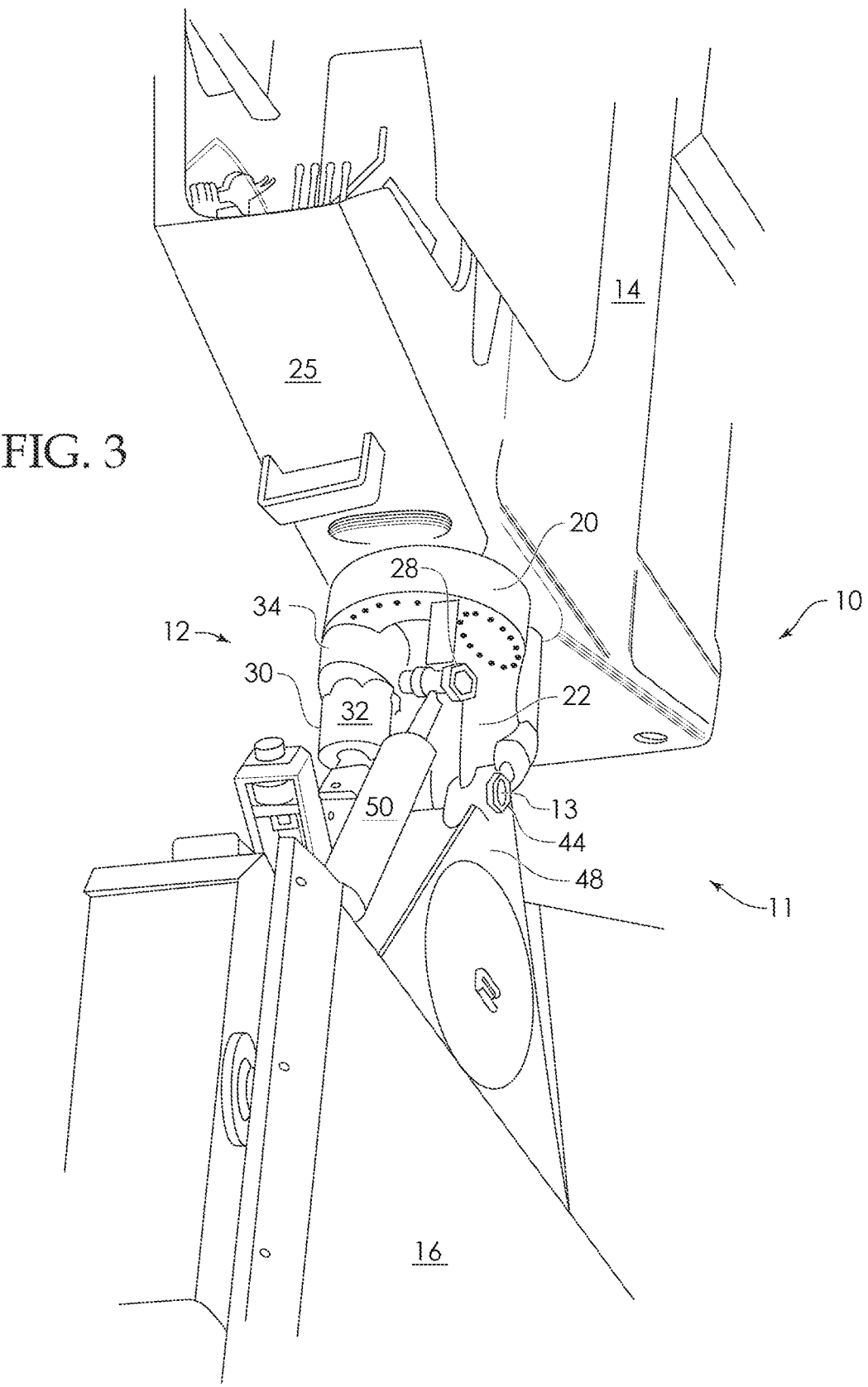

VERTICALLY ARTICULATING VEHICLE

RELATED APPLICATIONS

This application claims the benefit of U.S. Provisional Application Ser. No. 62/024,953 entitled "Vertically Articulating Vehicle" filed on 15 Jul. 2014, the contents of which are incorporated herein by reference in its entirety.

COPYRIGHT NOTICE

A portion of the disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

U.S. Pat. No. 4,890,684A teaches an articulated vehicle with a hinged joint which includes two wheeled sections hinged together in the middle of the vehicle by a universal movement joint enabling relative pivoting about three axes extending at right angles to each other through the center of the vehicle. A hydraulically operated strut extends between the two vehicle sections and is universally pivoted at its ends to the two vehicle sections to control the relative pivoting of the two vehicle sections about a transverse axis while enabling the middle of the vehicle to be raised or lowered for various reasons. The vehicle is steered by a pair of hydraulically operated steering struts extending between the two vehicle sections on the opposite sides of the universal movement joint.

U.S. Pat. No. 7,743,869, assigned to Listerhill Total Maintenance center, teaches a mining utility transport vehicle which utilizes upper and lower assemblies, rotation, and hydraulic/piston units connecting between two halves of a mine transport vehicle.

Caterpillar and Joy Global offer a variety of articulated vehicles, embodiments of which have complicated vertical articulation capability complex structures and hydraulics. U.S. Pat. No. 5,873,431, assigned to Joy M M Delaware, Inc., teaches an articulated vehicle having a first vehicle portion attached to a second vehicle portion by a joint assembly which includes bearing assembly that is pivotally attached to the first vehicle and attached to the second vehicle in addition to hydraulic piston units.

Other mining vehicles and payload movement devices utilize flexible attachments. U.S. Pat. No. 6,062,801, assigned to Gulf Transport, teaches multi-combination vehicle and method for transporting a payload in an underground mine that includes a mechanism between cars or payload transport that allows pivoting and rotation with hydraulic piston-cylinder units. U.S. Pat. No. 6,361,269, assigned to Gulf Transport, teaches a multi-combination vehicle and method for transporting a payload in an underground mine.

Further efforts to dampen articulated vehicles also exist. U.S. Pat. Nos. 5,174,597 and 5,137,107 teach articulation damping devices which use a hydraulic piston-cylinder unit connected pivotally for the joint of an articulated omnibus. U.S. Pat. No. 6,827,164 teaches an industrial truck having an articulated steering assembly between tractor and payload.

SUMMARY OF THE INVENTION

The present invention is drawn to an articulated vehicle including two wheeled sections hinged together in the middle of the vehicle by a universal movement joint enabling relative pivoting about three axes extending at right angles to each other through the center of the vehicle. A hydraulically operated strut and a hydraulically operated cylinder/jack extend between the two vehicle sections. The strut is universally pivoted at its ends to the two vehicle sections to control the relative pivoting of the two vehicle sections while, the cylinder is trunnion mounted to one end and bolted to the other to permit vertical articulation of the vehicle.

A design feature improves the performance of an articulated vehicle in adverse or rough terrain (as seen in mining or construction). The present design is an improvement of U.S. Pat. No. 4,890,684; the contents of which are incorporated herein in its entirety.

In addition to providing vertical articulation, an object of the present design is to provide an articulated vehicle of the type (typically) having two sections pivoted together at its middle and enabling the two vehicle sections to pivot relative to each other about three axes located at right angles to each other while maintaining the middle of the vehicle at the proper horizontal orientation relative to the two vehicle sections.

Another object of the present design is to provide an articulated vehicle providing a hinged connection in its middle enabling relative universal movement between the vehicle sections.

Another object of this design is to provide a hinged joint for the middle of an articulated vehicle which is relatively less expensive and less complicated than prior art joints of this type. The present design may further provide a plurality of hinged joints between articulated vehicle sections.

Another object of the present design is to provide an articulated vehicle having a hinged connection joining two vehicle sections and means for adjusting the relative horizontal orientation of the vehicle sections by raising or lowering the hinged connection as desired by the operator of the vehicle.

The special mount used to integrate the cylinder into the moving assembly has the advantage of being simpler to manufacture, install, and maintain than the cylinders used in the prior art. An oscillating ball bearing allows greater movement than previous designs.

The present design is simpler and has fewer parts then competitive designs, and is cheaper to manufacture, maintain, and service. U.S. Pat. No. 4,890,684 is an exception which is cost effective; however, the invention of U.S. Pat. No. 4,890,684 is no longer competitive due to limited oscillation capability.

Additionally, the overall vehicle length has been reduced compared to competitive versions. The optimized vertical articulation point is centered closer to the center of the vehicle's wheelbase increasing the maneuverability of the design, whereas competitive versions are offset. Moving assembly design and cylinder location offers near symmetrical movement of both vehicle sections. Competitor machine designs are offset providing an off-centered vertical articulation which is less desirable.

The present design further incorporates smaller, less cumbersome cylinder design. The oscillating ball bearing allows greater movement/oscillation capability than previous designs.

These and other aspects of the present invention will become readily apparent upon further review of the following drawings and specification.

BRIEF DESCRIPTION OF THE DRAWINGS

The novel features of the described embodiments are specifically set forth in the appended claims; however, embodiments relating to the structure and process of making the present invention, may best be understood with reference to the following description and accompanying drawings.

FIGS. 1A and 1B show top and side views of a vertically articulating vehicle according to the present design.

FIG. 3 is an elevated perspective view of the vertically articulating mechanism of an articulated vehicle according to the present design.

Similar reference characters denote corresponding features consistently throughout the attached drawings.

DETAILED DESCRIPTION OF PREFERRED EMBODIMENTS

Figure 2A:
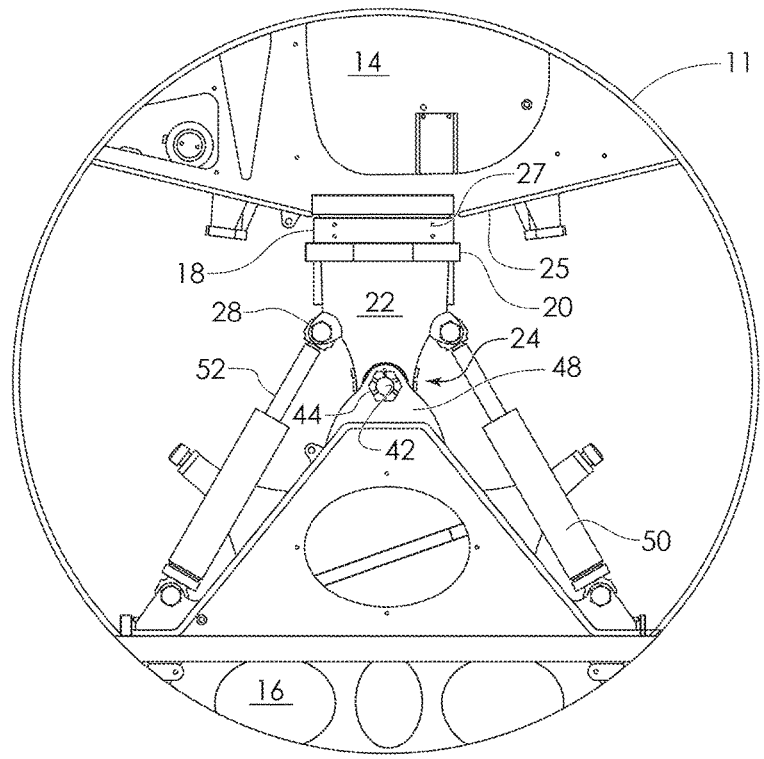
FIGS. 2A-2D show detailed close up of the vertically articulating mechanism of the present design utilized in a vertically articulating vehicle according to FIGS. 1A and 1B.
Figure 2B:
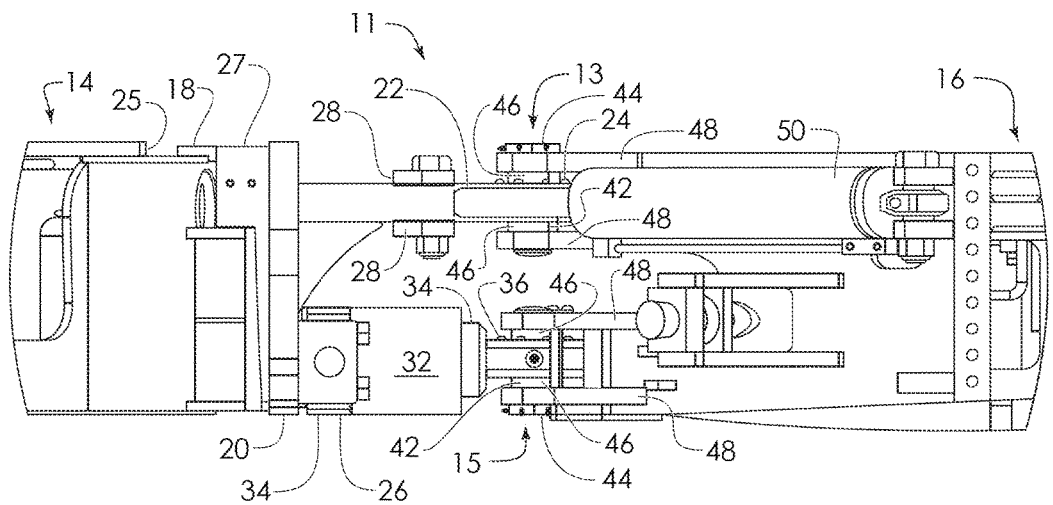
Figure 2C:
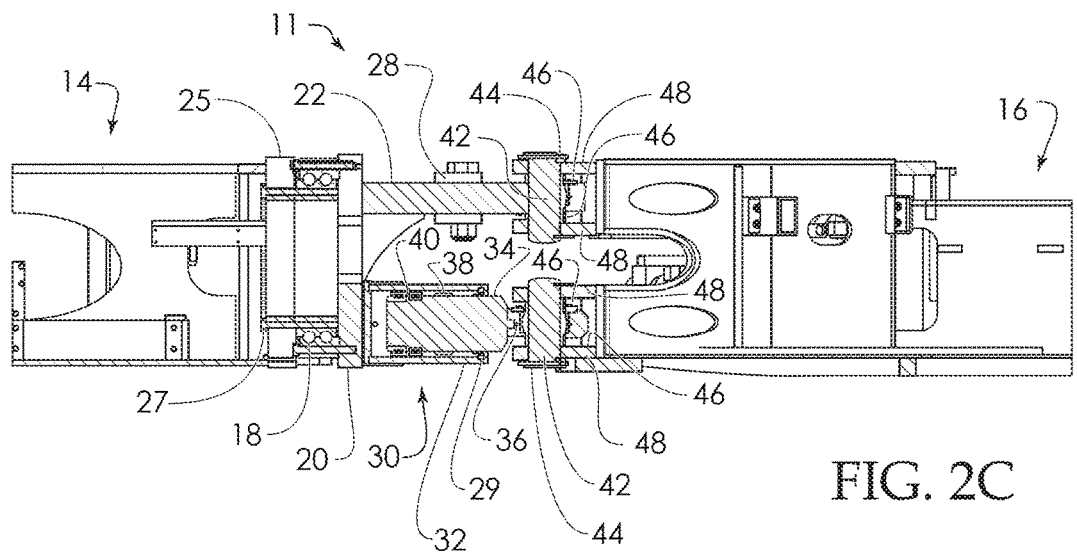
Figure 2D:
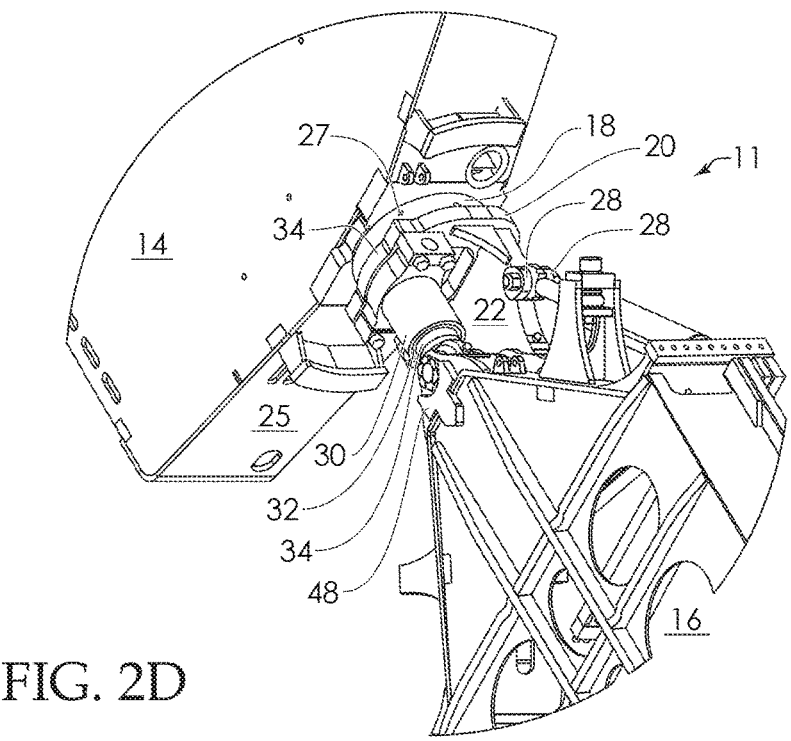

An articulated vehicle 10, shown in FIGS. 1A and 1B, includes two wheeled sections 14, 16 hinged together in the middle of the vehicle by a universal movement joint 11, shown in FIG. 2A, enabling relative pivoting about three axes X, Y, and Z extending at right angles to each other through the center of the vehicle. The axes X, Y, and Z are labeled in FIG. 5. The vertically articulating vehicle 10, which has a conventional battery-powered operation, is used in the mining industry. Top and side view of the vertically articulating vehicle 10 can be seen in FIGS. 1A and 1B. First and second hinged connections 13 and 15, are disposed between the front vehicle section 14 and the rear vehicle section 16. Each of the vehicle sections 14 and 16 includes an axle 17 with at least a pair of wheels 19 disposed on the axle 17. The front vehicle section 14, commonly called the tractor 14, has a battery 19 for powering the vehicle 10 and an operator station 21 for receiving the operator of the vertically articulating vehicle 10. The rear vehicle section 16, commonly called the trailer 16, includes a material carrying bed 23. Further details of the known operations of an articulated vehicle with hinged joint are discussed in U.S. Pat. No. 4,890,684, the contents of which are incorporated herein in their entirety. The present invention is not limited to the front and rear vehicle sections 14 and 16 as shown in the figures, or in the prior art, but includes additional embodiments such as a tractor 14 including a scoop or a trailer 16 with a passenger compartment.

The front vehicle section 14 includes a rear end 25 that has a moving assembly 12, affixed thereto, as shown in FIGS. 1A and 1B. The moving assembly 12 consists of an oscillating turntable style ball bearing 18, a moving assembly weldment 20, and fasteners 27. The moving assembly weldment 20 consists of a fixed swivel ear 22 with spherical bearing 24, a special cylinder mount 26, and four (4) steering cylinder ears 28. FIGS. 2A through 2D show the vertically articulating mechanisms more clearly.

Figure 4A:
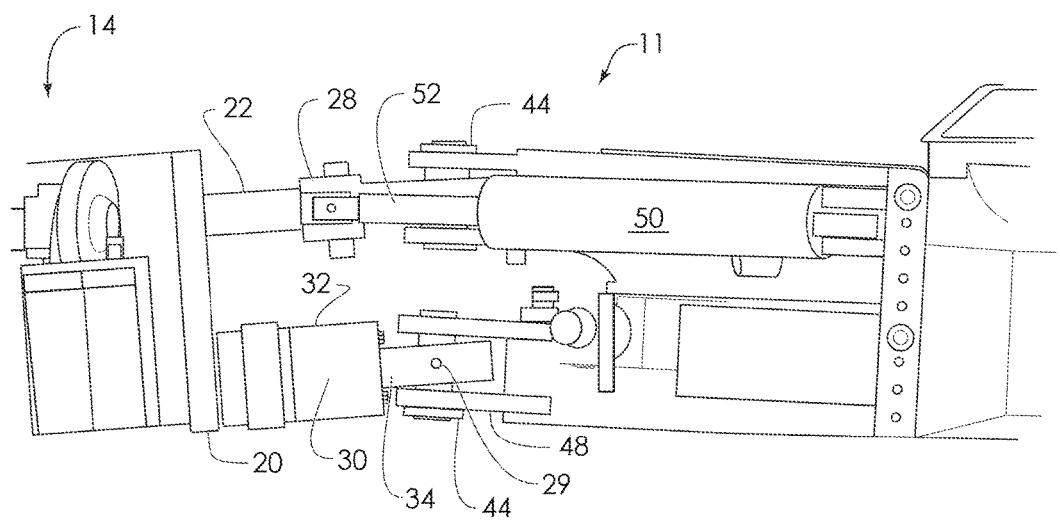
FIGS. 4A and 4B are side and elevated perspective views of an alternative embodiment of the present design.
Figure 4B:
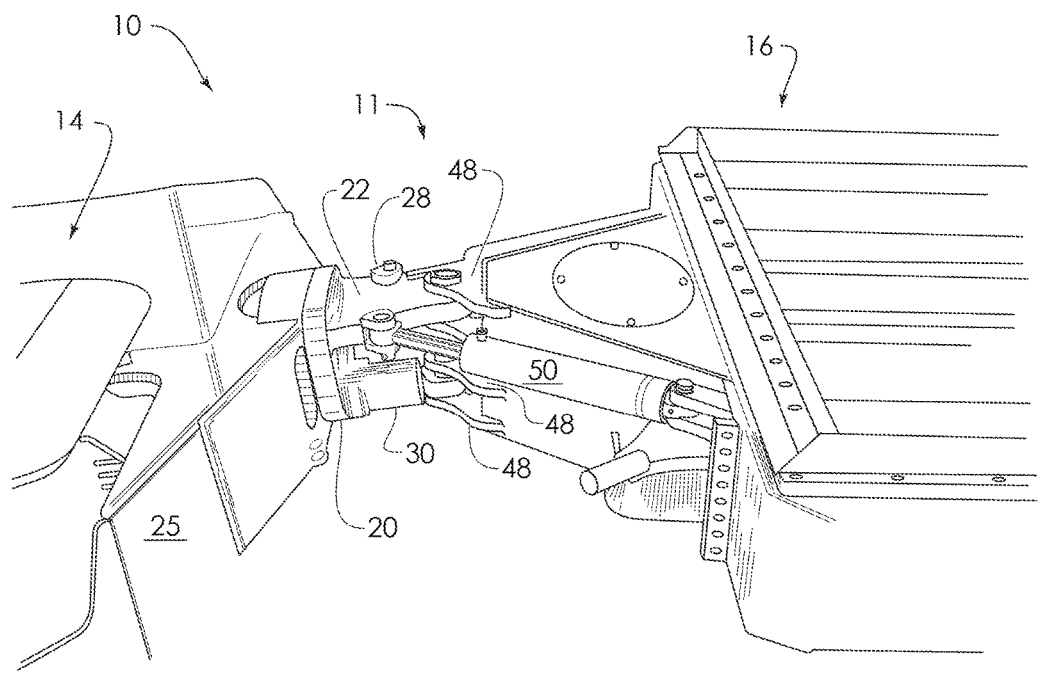
Figure 5:
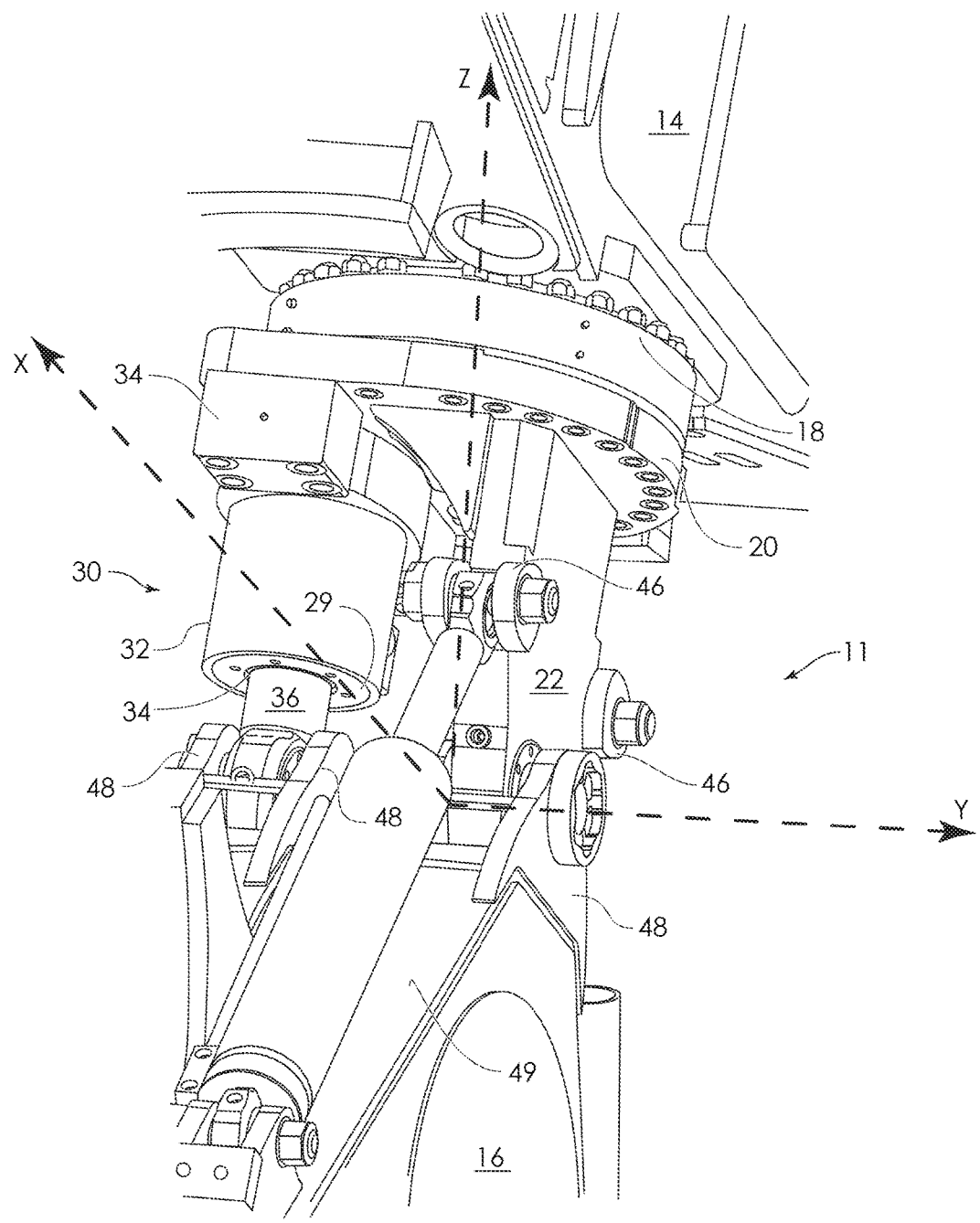
FIG. 5 is an elevated perspective of an articulated vehicle, showing the axes coordinates X, Y, and Z, according to an alternative embodiment of the present design.

A vertical articulation cylinder 30 consists of a cylinder housing 32, a cylinder rod 34 with spherical bearing 29, a piston 36, a stuffing box 38, and a counterbalance valve block 40. The cylinder housing 32, shown in FIG. 3, is either fixed bolted to the moving assembly 12 as shown in FIGS. 4A and 4B, or attached to the moving assembly 12 through a trunnion mount 34 as shown in the embodiments shown in FIG. 2D. FIG. 5 shows the trunnion mount 34 in more detail. The method of mounting the vertical articulation cylinder 30 can be seen in the figures.

Two (2) swivel pins 42, two (2) swivel pin castle nuts 44, four (4) bolt keepers 46, and four (4) pivot plates 48 are welded to the front 49 of the rear vehicle section 16 of the vertically articulating vehicle 10, as shown in FIG. 5, the pivot plates providing rear vehicle 16 first and second hinged connections 13 and 15. Steering rods 50 in a conventional arrangement are attached to the fixed swivel ear 22 at the steering cylinder ears 28 with the rod pistons 51 as shown, which are collectively referred to as a hydraulically operated strut.

Oscillating capability of the moving assembly 12 is achieved through the use of an oscillating turntable style ball bearing 18. Different styles of oscillating ball bearings can be used. Equivalent swivel pin and spherical bearing arrangements can be used. Allowable design modifications include the cylinder size and design, and adjustments to bore size, cylinder size, rod size and length are acceptable. Alternative moving assembly for the tractor end and pivot plate for the trailer end, including steel type and thickness adjustments may be used.

Steel material changes to plates, pins, etc. Oscillating turntable ball bearing and center section bearing are very useful. The fasteners are typically bolts, and of the same size throughout. Steel material types and sizes have relevance, and proper materials must be used for the task at hand. Hydraulic operating pressure of the cylinder is controlled. Cylinder or a jack are needed. Frame weldments must consist of steel, and the cylinder may be steel, or chrome rod.

It is to be understood that the present invention is not limited to the embodiments described above, but encompasses any and all embodiments within the scope of the following claims.

What is claimed is:

1. A vertically articulating vehicle, comprising:
   front vehicle section, rear vehicle section, a moving assembly weldment disposed on the rear of the front vehicle section between front and rear vehicle sections, and first and second hinged attachments disposed between the moving assembly weldment and the rear vehicle section with the first hinged attachment disposed along an axis of the second hinged attachment;
   a universal movement joint, comprising the moving assembly weldment including a hydraulically operated strut and a hydraulically operated cylinder, enabling relative pivoting about three axes extending at right angles to each other through the center of the vehicle extending rearward from the front vehicle section;
   the hydraulically operated strut being universally pivoted at its ends to the moving assembly weldment and to the rear vehicle section at the first hinged attachment to control the relative horizontal pivoting between first and second vehicle sections;
   the hydraulically operated cylinder mounted on the moving assembly weldment at the rear of the front vehicle section is trunnion mounted to the rear vehicle section at the second hinged attachment to permit vertical articulation of the vehicle; and
   wherein the moving assembly weldment is rotatably attached to the rear of the front vehicle section permitting radial rotation between the front and rear vehicle sections.

2. The vertically articulating vehicle of claim 1, wherein: the moving assembly is rotatably mounted on an oscillating turntable ball bearing which is mounted on the rear of the front vehicle section.

3. The vertically articulating vehicle of claim 1, wherein: the cylinder is trunnion mounted to the weldment.

4. The vertically articulating vehicle of claim 1, wherein: the cylinder is mounted directly to the weldment.

5. The vertically articulating vehicle of claim 1, wherein: the second hinged attachment is a trunnion mount allowing loose movement about the hinge.

6. The vertically articulating vehicle of claim 2, wherein: the cylinder is trunnion mounted to the weldment.

7. The vertically articulating vehicle of claim 6, wherein: the second hinged attachment is a trunnion mount allowing loose movement about the hinge.

8. The vertically articulating vehicle of claim 2, wherein: the cylinder is mounted directly to the weldment.

9. The vertically articulating vehicle of claim 8, wherein: the second hinged attachment is a trunnion mount allowing loose movement about the hinge.

10. An attachment arrangement for connecting front and rear vehicle sections for a vertically articulating vehicle, comprising:
    first and second hinged attachments disposed between front and rear vehicle sections with the first hinged attachment disposed along an axis of the second hinged attachment such that the first and second hinged attachments rotate in series;
    a universal movement joint, comprising a moving assembly weldment including a hydraulically operated strut and a hydraulically operated cylinder, enabling relative pivoting about three axes extending at right angles to each other through the center of the vehicle extending rearward from the front vehicle section;
    the hydraulically operated strut being universally pivoted at its ends to the moving assembly weldment and to the rear vehicle section at the first hinged attachment to control the relative horizontal pivoting between first and second vehicle sections;
    the hydraulically operated cylinder mounted on the moving assembly weldment is trunnion mounted to the rear vehicle section at the second hinged attachment to permit vertical articulation of the vehicle; and
    wherein the moving assembly weldment is rotatably attached to the rear of the front vehicle section permitting radial rotation between the front and rear vehicle sections.

11. The attachment arrangement for a vertically articulating vehicle of claim 10, wherein: the moving assembly is rotatably mounted on an oscillating turntable ball bearing which is mounted on the rear of the front vehicle section.

12. The attachment arrangement for a vertically articulating vehicle of claim 10, wherein: the cylinder is trunnion mounted to the weldment.

13. The attachment arrangement for a vertically articulating vehicle of claim 10, wherein: the cylinder is mounted directly to the weldment.

14. The attachment arrangement for a vertically articulating vehicle of claim 10, wherein: the second hinged attachment is a trunnion mount allowing loose movement about the hinge.

15. A universal movement joint for a vertically articulating vehicle with front and rear vehicle sections enabling relative pivoting about three axes extending at right angles to each other through a center of the vertically articulating vehicle extending rearward from the front vehicle section, comprising:
    a vertically articulating moving assembly having a moving assembly weldment with a first hinged attachment disposed along an axis of a second hinged attachment;
    the moving assembly weldment having
    a hydraulically operated strut and a hydraulically operated cylinder, enabling relative pivoting about the three axes affixed thereto;
    the hydraulically operated strut being universally pivoted at the first hinged attachment to control relative horizontal pivoting;
    the hydraulically operated cylinder mounted on the moving assembly weldment for trunnion mounting to the rear vehicle section at the second hinged attachment to permit vertical articulation; and
    wherein the moving assembly is rotatably mounted on an oscillating turntable ball bearing for mounting on the rear of the front vehicle section.

16. The universal movement joint for a vertically articulating vehicle of claim 15, wherein: the cylinder is trunnion mounted to the weldment.

17. The universal movement joint for a vertically articulating vehicle of claim 16, wherein: the second hinged attachment is a trunnion mount allowing loose movement about the hinge.

18. The universal movement joint for a vertically articulating vehicle of claim 15, wherein: the cylinder is mounted directly to the weldment.

19. The universal movement joint for a vertically articulating vehicle of claim 15, wherein: the second hinged attachment is a trunnion mount allowing loose movement about the hinge.

20. The universal movement joint for a vertically articulating vehicle of claim 18, wherein: the second hinged attachment is a trunnion mount allowing loose movement about the hinge.

* * * * *